(12) United States Patent
Davis et al.

(10) Patent No.: US 8,257,585 B2
(45) Date of Patent: Sep. 4, 2012

(54) DEBRIS CATCHER WITH RETENTION WITHIN SCREEN

(75) Inventors: John P. Davis, Cypress, TX (US); Paul L. Connell, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 399 days.

(21) Appl. No.: 12/546,839

(22) Filed: Aug. 25, 2009

(65) Prior Publication Data

US 2011/0049025 A1    Mar. 3, 2011

(51) Int. Cl.
*C02F 1/00* (2006.01)
*B01D 21/00* (2006.01)
*B01D 35/16* (2006.01)
*E21B 21/00* (2006.01)

(52) U.S. Cl. .................... 210/170.04; 210/299; 210/300; 210/301; 210/306; 210/308; 210/311; 210/336; 166/312

(58) Field of Classification Search ............ 166/99, 166/107, 312; 210/170.04, 299, 300, 301, 210/306, 308, 311, 336
See application file for complete search history.

(56) References Cited

U.S. PATENT DOCUMENTS

| | | | |
|---|---|---|---|
| 3,023,810 A * | 3/1962 | Anderson | 166/99 |
| 6,227,291 B1 | 5/2001 | Carmichael et al. | |
| 6,276,452 B1 * | 8/2001 | Davis et al. | 166/298 |
| 6,607,031 B2 | 8/2003 | Lynde et al. | |
| 7,040,395 B2 | 5/2006 | Booth | |
| 7,472,745 B2 | 1/2009 | Lynde et al. | |
| 7,497,260 B2 | 3/2009 | Telfer | |
| 7,562,703 B2 | 7/2009 | Palmer et al. | |
| 2009/0200010 A1 | 8/2009 | Davis et al. | |

* cited by examiner

*Primary Examiner* — Benjamin Kurtz
(74) *Attorney, Agent, or Firm* — Steve Rosenblatt

(57) ABSTRACT

A debris catcher uses induced circulation from a venturi to urge debris laden flow into the lower end of a housing. An inlet tube maintains velocity so as to keep the debris moving with the fluid stream as it goes up the inlet tube. A screen fits over the open end of the inlet tube and runs down around the inlet tube toward the entrance of the debris laden fluid into the lower end of the housing. There is a clearance around the cylindrical portion of the screen so some flow can exit that way. There is also an open exit through the top of the screen that can be reached after the fluid stream makes two hairpin turns. Many modules can be stacked. Each module has a large screen area for flow to exit and progressive modules can have smaller screen openings in an uphole flow direction.

24 Claims, 1 Drawing Sheet

DEBRIS CATCHER WITH RETENTION WITHIN SCREEN

FIELD OF THE INVENTION

The field of this invention is debris catchers for subterranean use and more particularly those types that use eductors to induce flow into a lower end of the debris catcher.

BACKGROUND OF THE INVENTION

For a variety of reasons debris can accumulate in a wellbore and needs to be removed. This can happen when something is milled out or simply from scale and other foreign material that is normally found on the interior wall of casing. There are various designs including some that are mounted to a tubular string and employ scrapers for dislodging the debris when the string moves in one direction and a flow diverter into a chamber where the debris is left behind and the fluid continues on a path that eventually bypasses the diverter so that the string is allowed to move up. One example of this design is U.S. Pat. No. 7,562,703. Other examples of debris catchers that rely on string movement are U.S. Pat. No. 7,040,395. Other designs use an eductor to induce circulation which sucks debris into an inlet tube that is centrally located in a housing. The velocity is allowed to slow to let the debris drop into a collection chamber and the flow continues up the housing through a screen and into the eductor inlet for recirculation. Some examples of this design are U.S. Pat. No. 6,276,452 and US Publication 2009/0200010.

A few other examples of debris catchers are in U.S. Pat. Nos. 7,497,260; 7,472,745; 6,227,291 and 6,607,031. There are issues with some of the past designs. The type of catchers that depend on flow diversion with cup seal sometimes use check valves that are in the debris path that can clog or the screens can plug and result in pulling a wet string or triggering a bypass to open so that no debris can be collected. In the circulating type of debris catchers the flow had to go through one or a series of inlet tubes that ultimately led to a single screen near the exit. The debris was supposed to have mostly dropped out before the screen was reached but if the debris was particularly fine it could be carried with the circulation flow to the screen that could clog and all circulation through the tool would stop.

The present invention addresses this issue in a debris catcher that can be in modular form to increase capacity. Each module has an inlet tube that emerges in a preferably cylindrically shaped screen. The debris that enters with a fluid stream has to negotiate two hairpin turns inside a screened space before any debris can either exit or go to the next module. In the negotiation of such turns the debris can drop out. The fluid flow can get through a module by using the cylindrical portion of the screen or the top of the screen since there is a clearance volume around the cylindrical portion of the screen. The top of the screen has an open exit so that the flow with any still entrained debris can exit to the next module or out of the housing, depending on the application. Those skilled in the art will more readily appreciate the present invention from a review of the detailed description of the preferred embodiment and the associated drawing while appreciating that the full scope of the invention is determined by the appended claims.

SUMMARY OF THE INVENTION

A debris catcher uses induced circulation from a venturi to urge debris laden flow into the lower end of a housing. An inlet tube maintains velocity so as to keep the debris moving with the fluid stream as it goes up the inlet tube. A screen fits over the open end of the inlet tube and runs down around the inlet tube toward the entrance of the debris laden fluid into the lower end of the housing. There is a clearance around the cylindrical portion of the screen so some flow can exit that way. There is also an open exit through the top of the screen that can be reached after the fluid stream makes two hairpin turns. Many modules can be stacked. Each module has a large screen area for flow to exit and progressive modules can have smaller screen openings in an uphole flow direction.

BRIEF DESCRIPTION OF THE DRAWING

The FIG. 1 is a section view of a two module assembly for the debris catcher showing the large available screen areas in each module.

DETAILED DESCRIPTION OF THE PREFERRED EMBODIMENT

Figure 1:
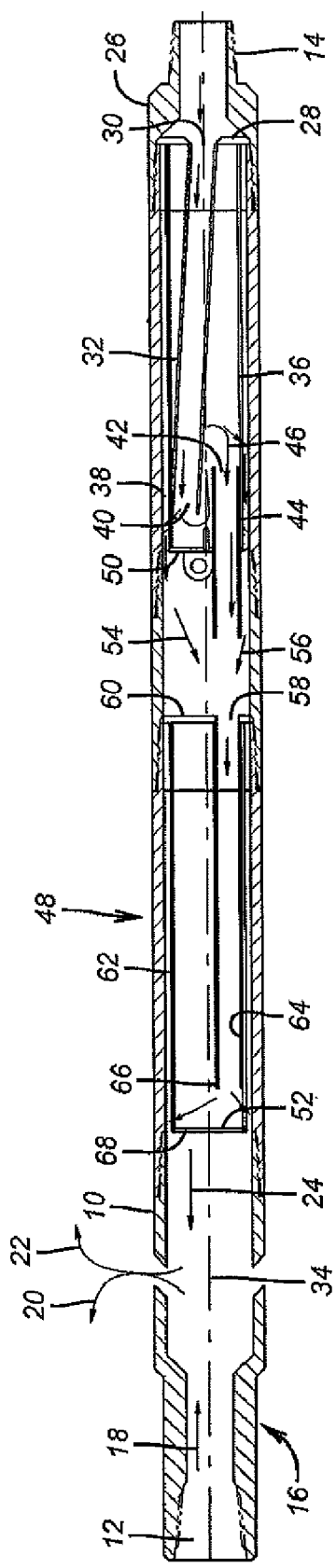

Those skilled in the art will appreciate that parts of the FIG. 1 are schematic and that details of how such a debris catcher generates a circulation flow using an eductor are described in the patents mentioned above and most particularly U.S. Pat. No. 6,276,452. Briefly, flow comes into housing 10 through an inlet 12 which is connected to a tubular string (not shown) that is connected at the surface to pumping equipment (also not shown). Threads 14 at the lower end of the housing 10 are connected to a mill (not shown) that generates cuttings and passes them internally of the mill to connection 14 via one or more connecting tubulars that are also not shown. The jet bushing or eductor assembly 16 uses flow from the surface represented by arrow 18 as the motive fluid. The eductor exit stream diverges and goes back uphole as represented by arrow 20 or downhole as represented by arrow 22. The flow going downhole is smaller than the flow going back to the surface. The flow going downhole represented by arrow 20 reaches the mill and takes away the cuttings through the inside of the mill and into the housing 10. The eductor assembly 16 reduces pressure in the housing 10 and induces the flow represented by arrow 24. That induced flow is what creates the recirculation that starts as arrow 22 and ends as arrow 24. The other circulation path with the surface is represented by arrows 18 and 20.

Looking now toward the lower end 26 of housing 10 there is an inlet plate 28 with an opening 30 that leads to inlet tube 32. The tube 32 can be aligned with the axis 34 or skewed, as shown. A cylindrically shaped screen 36 has an annular clearance space 38 around it so that filtered flow that exits the top 40 of tube 32 can either go through the screen 36 or it can reverse direction and make a hairpin turn to get to the bottom 42 of exit tube 44 and then make a second hairpin turn represented by arrow 46 to get out unscreened through tube 44 with entrained debris that did not fall down onto plate 28 carried to the next stage 48. Note that the top 50 of the screen 36 can preferably be a solid plate to aid in redirecting flow toward the bottom 42 of tube 44. However in the uppermost module such as 48 in the FIG. 1 the top 52 can be screen material. Arrows 54 and 56 represent flow that has gone around the solid top 50 and into the annular space 38 to reach the inlet 58 in plate 60 from which screen 62 extends.

Module 48 can be one of many depending on the volume of debris storage required from the particular ongoing milling operation. It has an inlet tube 64 that has an open top 66.

Screen 62 has a screen top 68 because screen 62 is the final and smallest size of debris removal and what gets through screen 62 can just become part of the inlet flow to the eductor represented by arrow 24.

It should be note that the screen opening size when there a multiple modules gets smaller as the flow continues uphole through housing 10 back to the eductor assembly 16. Preferably, tube 44 is aligned with the inlet 58 to the next stage so that if circulation is stopped debris in tube 64 can fall into tube 44 and be trapped further down in housing 10 without accumulating in the space between the modules.

Those skilled in the art will appreciate that in each stage there is a very large screen area that extends more than the length of the inlet tube so that the flow can keep moving with a reduced likelihood that the solids will foul the screen completely. Even if the screen such as 36 becomes clogged, the debris can still be captured within it as the flow continues to the open tube 44 to the next stage, if any, or back to the eductor assembly 16. Since the flow will go to those portions of the screen such as 36 that are open to flow, the possibility of continuing to capture debris is there as long as the debris exits a particular inlet tube and the debris size is larger than the screen opening size. If the debris is smaller than the screen size in a particular stage then it simply passes through to get caught in later stages. The clearance around each screen in any stage such as 38 insures that the screen area for screen 36 is available and that any debris that does get through that screen will not get caught in the annular space because the width of the annular space is larger than the screen opening size that is used to form the annular space.

Figure 2:
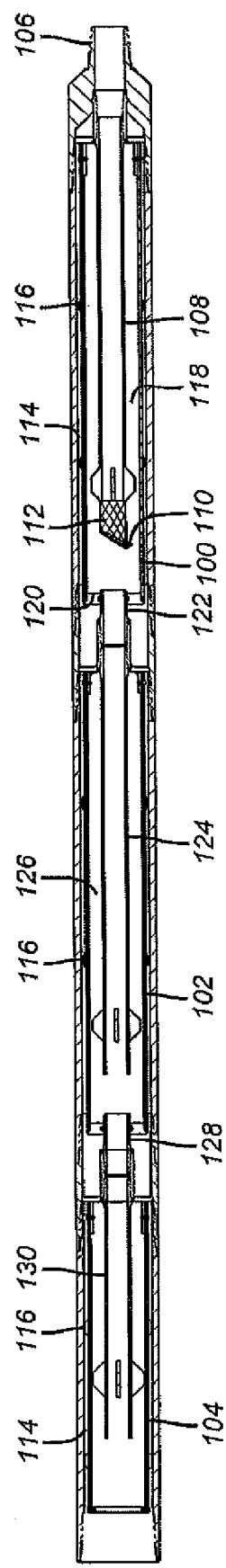
FIG. 2 is an alternative and the preferred embodiment to the FIG. 1 embodiment.

FIG. 2 shows a stack of three screen assemblies 100, 102 and 104. The remainder of the assembly beyond what is described in this paragraph is the same as the FIG. 1 embodiment. Screen 100 is the lowermost and takes induced flow into inlet 106 that has entrained debris and carries it up flow tube 108. Flow into tube 108 flips the pivoting cover 110 as the path of least resistance as compared to flow through the screen 112 that sits just below the pivoting cover 110. An annular space 114 exists about all three screens 100, 102 and 104 with stabilizers 116 in the annular space 114 to keep the screens 100, 102 and 104 centered. Flow out of tube 108 slows down to drop solids in a surrounding annular space 118. Flow with any remaining solids goes through the plate 120 through tube 122 which continues to become the next flow tube 124. At the end of tube 124 the solids drop into annular space 126 and further flow with any remaining solids goes through exit tube 128 and into its continuation which is flow tube 130. This pattern repeats depending on how many screen stages are present. In this design it is preferred that all the stages have the same opening size so that any solids that get through anywhere in any of the stages will be of a small enough size as to not present an operational concern for the eductor assembly 16 and that the velocity in the annular space can stay high enough to keep any solids moving up the space 114 moving out of such annular space rather than accumulating in it. In this embodiment, the flow tubes are aligned between stages and any number of stages can be used depending on the expected debris loading. When circulation is shut off the pivoting cover 110 closes to keep debris from falling back into inlet 106. Screen 112 allows fluid to move through the assembly when pulled out of the hole to avoid pulling a wet string.

The above description is illustrative of the preferred embodiment and various alternatives and is not intended to embody the broadest scope of the invention, which is determined from the claims appended below, and properly given their full scope literally and equivalently.

We claim:

1. A debris catcher for subterranean use, comprising:
a housing having a first inlet to provide pressurized fluid to an eductor assembly mounted in a passage therein for inducing flow through said passage;
a second inlet to receive debris laden fluid induced to flow into said passage by said eductor assembly;
at least one screen in fluid communication with said second inlet and disposed in said passage, said screen defining at least one debris collection settling volume;
an inlet tube extending from a bottom on said screen and extending to a top adjacent a top of said screen, said bottom located adjacent said second inlet
said debris collection volume disposed between said inlet tube and said screen
said screen top having an exit opening as an alternate exit path to fluid flowing through said screen.

2. The debris catcher of claim 1, further comprising:
an inlet tube extending from a bottom on said screen and into said screen, said bottom located adjacent said second inlet.

3. The debris catcher of claim 2, wherein:
said inlet tube is aligned with a longitudinal axis of said passage.

4. The debris catcher of claim 2, wherein:
said inlet tube is misaligned with a longitudinal axis of said passage.

5. The debris catcher of claim 2, wherein:
said screen has a solid top and said inlet tube has a longitudinal axis intersecting said solid top causing flow exiting said inlet tube to make a turn.

6. A debris catcher for subterranean use, comprising:
a housing having a first inlet to provide pressurized fluid to an eductor assembly mounted in a passage therein for inducing flow through said passage;
a second inlet to receive debris laden fluid induced to flow into said passage by said eductor assembly;
at least one screen in fluid communication with said second inlet and disposed in said passage, said screen defining at least one debris collection settling volume;
an inlet tube extending from a bottom on said screen and into said screen, said bottom located adjacent said second inlet;
said screen has a solid top and said inlet tube has a longitudinal axis intersecting said solid top causing flow exiting said inlet tube to make a turn;
said solid top has an outlet opening with an exit tube extending through it.

7. The debris catcher of claim 6, wherein:
said exit tube forces flow though said inlet tube to reverse direction twice to get into said outlet tube.

8. The debris catcher of claim 7, wherein:
said at least one screen comprises a plurality of screens stacked in said passage.

9. The debris catcher of claim 8, wherein:
said exit tube in a first of said screens is aligned with said inlet tube of an adjacent second screen located between said first screen and said eductor assembly.

10. The debris catcher of claim 8, wherein:
said screens have openings that vary in size as between screens.

11. The debris catcher of claim 10, wherein:
the opening size of screens gets smaller the closer a screen is mounted to said eductor assembly.

12. The debris catcher of claim 8, wherein:
said screen mounted closest to said eductor assembly has a top fully made of screen material.

13. A debris catcher for subterranean use, comprising:
a housing having a first inlet to provide pressurized fluid to an eductor assembly mounted in a passage therein for inducing flow through said passage;
a second inlet to receive debris laden fluid induced to flow into said passage by said eductor assembly;
at least one screen in fluid communication with said second inlet and disposed in said passage, said screen defining at least one debris collection settling volume;
an inlet tube extending from a bottom on said screen and into said screen, said bottom located adjacent said second inlet;
said at least one screen comprises a plurality of screens stacked in said passage.

14. The debris catcher of claim 13, wherein:
said screens have openings that vary in size as between screens.

15. The debris catcher of claim 14, wherein:
the opening size of screens gets smaller the closer a screen is mounted to said eductor assembly.

16. The debris catcher of claim 15, wherein:
said screen mounted closest to said eductor assembly has a top fully made of screen material.

17. The debris catcher of claim 15, wherein:
a lowermost screen has an inlet tube extending from a bottom and into said screen, said bottom located adjacent said second inlet.

18. The debris catcher of claim 17, wherein:
all said screens except the screen closest to said eductor assembly have a solid top and said inlet tube has a longitudinal axis intersecting said solid top causing flow exiting said inlet tube to make a turn.

19. The debris catcher of claim 18, wherein:
said solid top has an outlet opening with an exit tube extending through it;
said exit tube forces flow though said inlet tube to reverse direction twice to get into said outlet tube.

20. The debris catcher of claim 19, wherein:
said exit tube in a first of said screens is aligned with said inlet tube of an adjacent second screen located between said first screen and said eductor assembly.

21. The debris catcher of claim 13, wherein:
said plurality of screens comprises a lowermost screen having a bottom located adjacent said second inlet and an inlet tube extending into said bottom screen and at least one additional screen with its inlet tube extending into said additional screen so that said inlet tubes are substantially aligned with each other for flow through said passage.

22. The debris catcher of claim 13, wherein:
the opening size for all screens is substantially the same.

23. The debris catcher of claim 13, wherein:
said screens define a surrounding annular space to allow use of screen area defining said annular space progressively as a screen clogs with debris.

24. The debris catcher of claim 23, wherein:
said annular space outside one screen communicates in said passage with an annular space outside another screen.

* * * * *